United States Patent [19]

Juy

[11] 3,994,167

[45] Nov. 30, 1976

[54] SPEED CHANGE MECHANISM FOR A BICYCLE

[76] Inventor: Lucien Charles Hippolyte Juy, Rue de la Breuchilliere, Zone Industrielle Nord, 21003 Dijon Cedex - Cote d'Or, France

[22] Filed: Feb. 20, 1975

[21] Appl. No.: 551,414

[30] Foreign Application Priority Data

Feb. 22, 1974   France .............................. 74.06945

[52] U.S. Cl. .................................. 74/217 B; 74/242
[51] Int. Cl.² ..................... F16H 11/08; F16H 7/18; F16H 7/22
[58] Field of Search .................. 74/217 B, 241.11 B, 74/242.14 B, 242.15 B, 242

[56] References Cited
UNITED STATES PATENTS
3,710,636   1/1973   Ozaki ................................ 74/217 B
FOREIGN PATENTS OR APPLICATIONS
931,849   7/1963   United Kingdom ............... 74/217 B

*Primary Examiner*—Samuel Scott
*Assistant Examiner*—A. Russell Burke
*Attorney, Agent, or Firm*—Haseltine, Lake & Waters

[57] ABSTRACT

A speed change mechanism for a bicycle having a gear cluster of pinions on which a chain is selectively engaged, such as on a derailleur or the like, comprising a chain-tensioning system including at least one sprocket wheel engaging the chain, a transverse displacing mechanism coupled to the chain-tensioning system to shift the same and the chain on the pinions during speed change, and a cap member preferably including side parts straddling the sprocket wheel. The sprocket wheel is coupled to the transverse displacing mechanism for rotation about an axis and the cap member is connected to the transverse displacing mechanism such that the cap member has a fixed angular position relative to the axis. The cap member has front and rear side parts, the front side part being prolonged longitudinally towards the gear cluster to push and guide the chain proximate the pinions during speed change.

10 Claims, 8 Drawing Figures

SPEED CHANGE MECHANISM FOR A BICYCLE

FIELD OF THE INVENTION

The invention relates to a speed change mechanism for a bicycle and particularly to a derailleur having a push member incorporated therein for pushing against the drive chain near the teeth of the pinions of the gear cluster on the rear wheel of the bicycle.

PRIOR ART

Speed change mechanisms for bicycles are known, particularly those which are mounted and fixed on or near the axle of the rear wheel of the bicycle. These speed change mechanisms generally comprise a chain-tensioning system constituted by two sprocket or jockey wheels mounted between two flanges, and a system for transversely displacing the chain-tensioning system to derail the chain from one pinion in the gear cluster to another to change the drive ratio, the pinions being mounted on the hub of the rear wheel. The transverse displacement mechanism can be a slidable axle carrying the sprocket wheels of the chain-tensioning system and their connecting flanges, or it can be an articulated parallelogram linkage.

Several disadvantages are found in the space separating the upper sprocket wheel and the pinions of the gear cluster. Over this free length, the chain is subject to substantial impact and deformation and there are difficulties in displacing the chain in the two opposite transverse directions. Furthermore, the links of the chain constantly undergo successive rubbing and impact forces because the flanges which push and guide the chain are pivotable.

Up to the present, there is no solution to remedy these disadvantages.

SUMMARY OF THE INVENTION

An object of the invention is to provide a speed change mechanism whose construction brings a solution to the double effect of transverse pushing on the chain proximate the pinions of the gear cluster in both directions of transverse displacement while avoiding the damaging effect on the chain and while permitting most rapid and easy displacements of the chain.

The speed chain mechanism according to the invention comprises a transverse displacement mechanism for the chain-tensioning system constituted by at least one sprocket wheel (generally two are provided), the sprocket wheel being displaced transversely and parallel to itself, said speed change mechanism being characterized in that it is provided with a cap member having side parts suitably shaped and straddling the sprocket wheel, the axle of the sprocket wheel being connected in a bearing of the transverse displacement mechanism, said cap member having a fixed angular position with respect to said bearing.

According to another feature of the invention, the front side of the cap member is prolongated and shaped longitudinally in upward direction towards the gear cluster to push and guide the chain proximate the teeth of the pinions of the gear cluster, the upper edge of the front side part having a radius of curvature slightly greater than the next to the largest last pinion of the gear cluster.

According to another feature of the invention, the rear side part of the cap member (the furthest from the support plate to the bicycle frame) is shaped, particularly the length of the upper edge has a radius of curvature a little greater than the radius passing through the top of the teeth of the last pinion of largest diameter.

DETAILED DESCRIPTION

Figure 1:
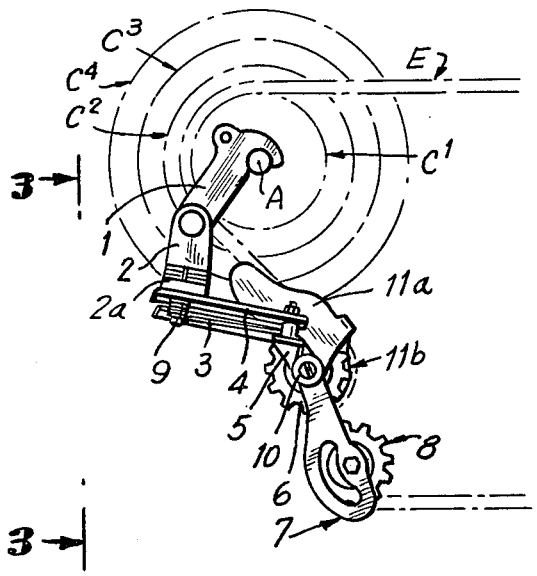
FIG. 1 is a side elevational view of a speed change mechanism having an articulated parallellogram linkage for transverse displacement, and a cap member according to the invention, the cap member being shown in the position in which the chain is wound on the smallest diameter pinion of the gear cluster.

There is seen in FIGS. 1–6 a non-limiting embodiment according to which the speed change mechanism is of the type mounted on an axle A of a hub B on the rear wheel. The hub carries, in conventional fashion, a free wheel with a gear cluster of a plurality of coaxial pinions $C_1$–$C_2$–$C_3$–$C_4$. Although there are four pinions in the represented embodiment, it is evident that the free wheel could have any greater or lesser number of pinions.

There is also seen a plate 1 fixed to a plate D of the frame and on the axle of the rear wheel. The plate 1 carries the assembly of the speed change mechanism. The latter can be fixed in any other suitable fashion with respect to the frame of the bicycle.

The speed change mechanism which is illustrated is of the derailleur type whose transverse displacement system comprises an articulated parallelogram linkage. Advantageously, the speed change mechanism is of the type shown in French Pat. No. 1604767.

In this speed change mechanism on the plate 1 is fixed an upper support of the parallelogram linkage. This support is constituted by two parts 2, 2a, fixedly connected by a hinge mounting which allows adjustment in order to regulate the angular position of the derailleur assembly with respect to the plane of the pinions and sprockets of the bicycle.

On the part 2a of the upper support are pivotably mounted one extremity of each of two levers or links 3 and 4 each of whose other extremities is pivotably connected to a lower support 5. This support is fixed to a part 5a receiving an axle (shown by axis X—X in FIG. 4) on which an upper sprocket wheel 6 rotates and a flange 7 pivots, said flange 7 carrying a lower sprocket wheel 8.

Figure 2:
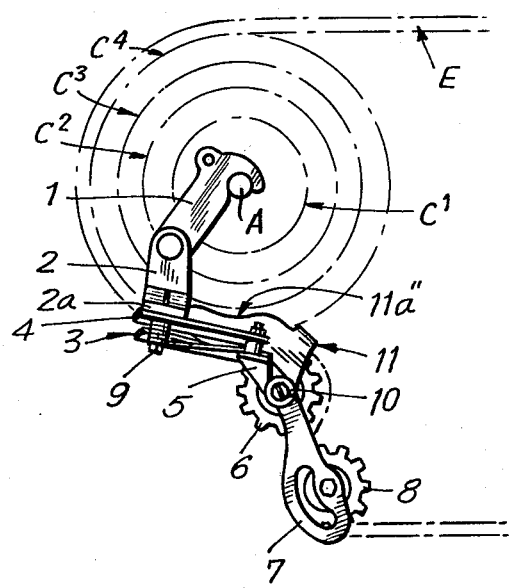
FIG. 2 is a view similar to FIG. 1, but wherein the chain is wound on the largest diameter pinion of the gear cluster.
Figure 3:
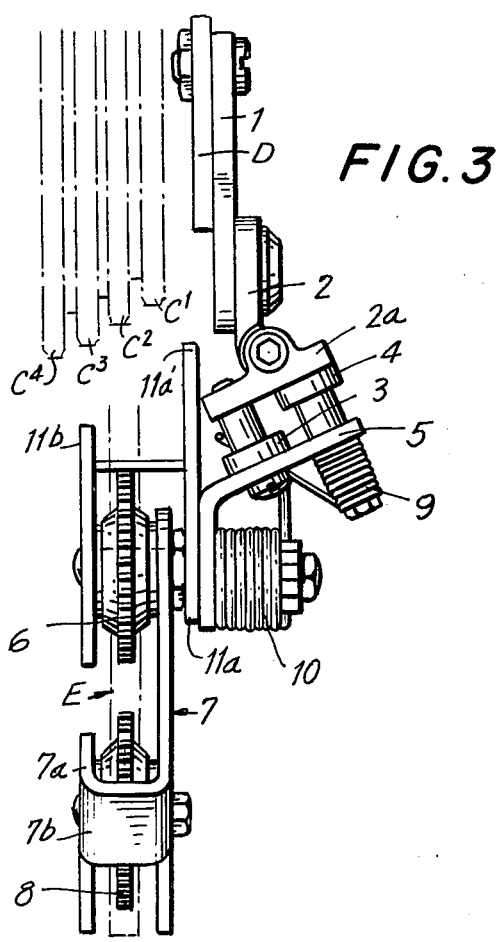
FIG. 3 is a front view on larger scale as seen along lines 3—3 in FIG. 1.
Figure 4:
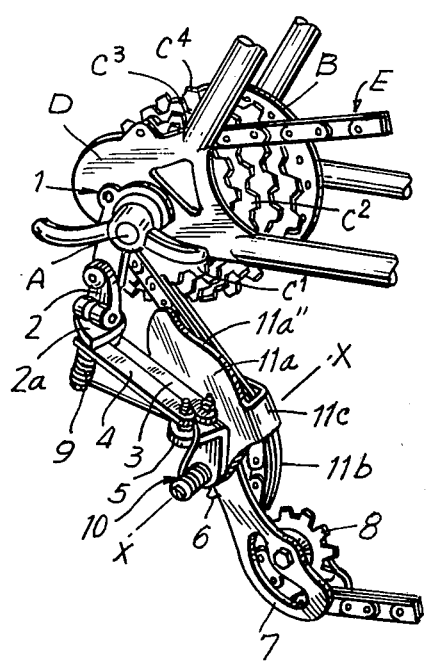
FIG. 4 is a perspective view of the speed change mechanism of FIG. 1.
Figure 6:
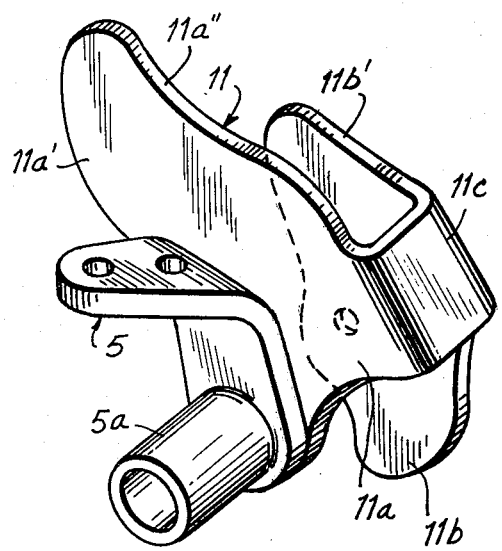
FIG. 6 is a perspective view on larger scale of the cap member.

Springs 9 and 10 respectively act to urge the parallelogram linkage in a direction tending to separate the sprocket wheels 6, 8 from the bicycle frame and to pivot the flange 7 and sprocket wheel 8 clockwise about the axle X—X in FIGS. 1, 2 and 4, in order to constantly tension a chain E. The assembly of the upper and lower sprocket wheels 6, 8 and flange 7 thus constitute a chain-tensioning assembly which serves to guide the chain into the selected pinion of the gear cluster while maintaining the chain under tension. A control cable system (not shown) allows deforming the articulated parallelogram linkage to displace the chain inwardly on the pinions. Abutments with adjustable screws allow limiting the deformation of the parallelogram linkage and the transverse displacement in both directions.

According to the invention, a cap member designated in entirety by numeral 11 (see FIG. 6) has two side parts, i.e., a front side part 11a and a rear side part 11b connected by a web part 11c. FIG. 4 shows how the chain E passes from one of the pinions down to and through the cap member 11, inside the web part 11c, then passing successively about opposite sides of the wheels 6 and 8.

The front side part 11a (disposed further to the exterior) is prolonged and profiled at 11a' longitudinally and upwardly towards the gear cluster on the free wheel. An upper edge 11a'' has a curvature whose radius is slightly greater than the next to last pinion $C_3$ on the free wheel. In this way, in the position shown in FIG. 2, the side part 11a pushes the chain into proximity with the last pinion $C_4$.

The rear side part 11b (situated more to the interior) is of profiled shape of smaller size and has a curvature or shape over the length of the upper edge at 11b' whose radius of curvature is slightly greater than the radius passing through the top of the teeth of the last pinion $C_4$ of greatest diameter. Thus, in the position shown in FIG. 2, the side part 11b can pass below pinion $C_4$ in order to permit feeding of the chain onto this pinion.

By virtue of the prolongation of the profile at 11a', whatever the transverse position of the chain E to pass on one of the pinions of the gear cluster on the free wheel, the chain is pushed and guided at least near each of these pinions in effective manner eliminating deformation effects.

In significant manner, the cap member 11 has an angular position which is fixed with respect to axis X—X (FIG. 4) of the sprocket wheel 6 connected to the transverse displacement mechanism. There is thus obtained a precise pushing force in both directions of transverse displacement on the chain, diminishing shock forces and frictional rubbing.

As can be seen when comparing FIGS. 1 and 2, where the chain E is trained respectively about the smallest and the largest pinions $C_1$ and $C_4$, the cap member 11 can perform a limited pivotal movement about the common pinion axis, by way of the pivotable plate 1 and parts 2, 2a. Flange 7 pivots about the axis X—X, with respect to cap member 11, as can be seen in FIG. 2.

The inner surfaces of the side parts and web of the cap member are of suitable material and finish to reduce friction and minimize noise. The cap member can be made of plastic material for these purposes.

In the illustrated embodiment, the fixed angular position can be effected by fixedly attaching the cap member 11 to the lower support 5 of the transverse displacement mechanism by welding, riveting, forming the elements as a one-piece body, etc.

In an embodiment of the speed change mechanism of the type in which a sliding axle transversely displaces the sprocket wheels, the cap member 11 will have a fixed angular position with respect to this sliding axle, while transversely accompanying the upper sprocket wheel. For this purpose, the cap member 11 and the sliding axle can cooperate by means of guide grooves or the like.

In further regard to these embodiments, the chain-tensioning system of the sprocket wheels comprises the single front flange 7 pivotably mounted around the X—X axis. This flange connects the two wheels 6 and 8. A rear flange 7a (see particularly FIG. 5) is of reduced size limited to the mounting of the lower wheel 8. A web 7b connects flanges 7 and 7a. The assembly of 7, 7a, 7b can be realized as a single member by cutting and folding a blank as illustrated in the drawing. The same assembly can also be made by molding a plastic material or other material or materials.

Figure 8:
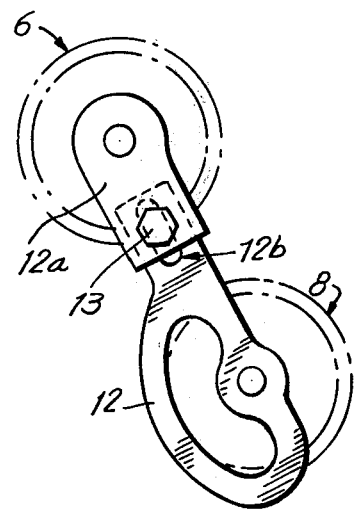
FIG. 8 is a side view of a modified front connector plate for the sprocket wheels of the chain-tensioning system enabling adjustment of the spacing between the wheels.

In a variant illustrated in FIG. 8, the pivotal front flange is made from two parts 12, 12a which are secured to one another and are capable of longitudinal sliding adjustment by having complementary sectional profiles. Part 12 has a slot 12b allowing longitudinal sliding adjustment therein of a fastener 13 constituted, for example, by a bolt and nut secured in part 12a. Thereby, the distance between the centers of wheels 6 and 8 can be adjusted whereby the capacity of the chain-tensioning system can provide a smaller or greater free length of the chain in accordance with the size of the pinions and sprockets utilized.

Figure 7:
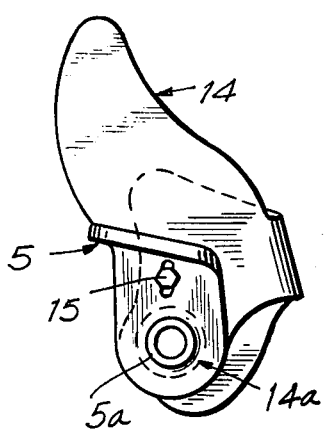
FIG. 7 is a side view of a variant of the cap member which is adjustable with respect to the lower level support of the parallelogram linkage.
Figure 5:
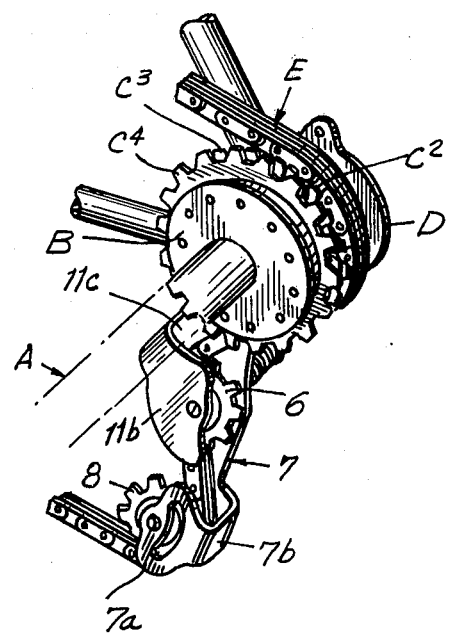
FIG. 5 is a perspective view similar to FIG. 4 but from the other side on the interior or hub side of the bicycle.

Another variation is shown in Fig. 7. Therein a cap member 14 (similar to cap member 11) is mounted in adjustable manner with respect to the support 5 or ultimately with respect to the member of the mechanism for transverse displacement to which the cap member is fixedly connected.

To operate the adjustable mounting, in FIG. 7, an opening of large diameter 14a is formed for the mounting around the axis X—X and a slot or enlarged opening receives a fastener 15 such as a bolt and nut combination which secures the cap member 14 to the lower support 5. There can thus be obtained a finished adjusted position of the side parts of the cap members with respect to the chain and to the pinions in order to obtain the optimal effect of pushing and guiding.

The invention is not limited to the specific disclosed embodiments which have been given by way of example, but in contrast embraces all modifications and variations falling within the scope and spirit thereof as defined in the appended claims.

What is claimed is:
1. A speed chain mechanism for a bicycle having a gear cluster of coaxial pinions on which a chain is selectively engaged, the mechanism comprising a chain-tensioning system including at least one sprocket wheel engaging said chain, a transverse displacing mechanism coupled to said tensioning system to shift the same and said chain on said pinions transversally during speed change, and a cap member including side parts, capable of partly straddling said sprocket wheel and being adapted to push and guide said chain proximate the pinions during gear change, the latter being coupled to said displacing mechanism for partial rotation about an axis, and means coupling said cap member to said displacing mechanism such that said cap member has a substantially fixed angular position relative to the rota- tional axis, but capable of limited pivotal movement about the common axis of said pinions.

2. The speed change mechanism as claimed in claim 1 wherein said cap member has front and rear side parts, said front side part being prolonged longitudinally towards said gear cluster to push and guide said chain proximate said pinions.

3. The speed change mechanism as claimed in claim 2 wherein said pinions are arranged in successively decreasing size from inside to outside, said prolonged front side part allowing to pass the next to last largest pinion but not the largest last pinion.

4. The speed change mechanism as claimed in claim 3 wherein said rear side part is smaller than said front side part and is capable of travelling past the said largest last pinion.

5. The speed chain mechanism as claimed in claim 4, wherein said tensioning system includes two of said sprocket wheels engaging said chain, one sprocket wheel being an upper sprocket wheel, the other a lower sprocket wheel, a front flange mounted on the rotational axis for pivotal movement with respect to said cap member, said front flange connecting said sprocket wheels, a smaller rear flange limited to the mounting of said lower sprocket wheel, and a web connecting said flanges.

6. The speed change mechanism as claimed in claim 5 wherein said front flange includes two parts, one carrying said upper sprocket wheel, the other said lower sprocket wheel, and means connecting said parts of the front flange to adjust the distance between said upper and said lower sprocket wheels.

7. The speed change mechanism as claimed in claim 1 wherein said cap member has inner surfaces facing said sprocket wheel and said chain, and is of such material and finish to minimize friction and diminish noise.

8. The speed change mechanism as claimed in claim 7 wherein said cap member is made of plastic material.

9. The speed change mechanism as claimed in claim 1 wherein said displacing mechanism further includes a deformable parallelogram linkage including a lower support fixedly secured to said cap member.

10. The speed change mechanism as claimed in claim 1 wherein said displacing mechanism further includes a deformable parallelogram linkage including a lower support, and means securing said linkage to said lower support in an adjustably fixable relation.

* * * * *